Sheet 1 - 2 Sheets.

W. B. Bement,
Slotting Machine,

Nº 28,627.  Patented June 5, 1860.

Witnesses:
Henry Howson
Charles E. Foster

Inventor:
Wm. B. Bement

Sheet 2 - 2 Sheets.

W. B. Bement,
Slotting Machine,

N° 28,627. Patented June 5, 1860.

Witnesses:
Henry Howson
Charles C. Foster

Inventor:
Wm B. Bement

UNITED STATES PATENT OFFICE.

WM. B. BEMENT, OF PHILADELPHIA, PENNSYLVANIA, ASSIGNOR TO HIMSELF AND JAMES DOUGHERTY.

MACHINE FOR CUTTING KEY-SEATS, &c.

Specification of Letters Patent No. 28,627, dated June 5, 1860.

*To all whom it may concern:*

Be it known that I, W. B. BEMENT, of the city of Philadelphia and State of Pennsylvania, have invented a new and Improved Machine for Cutting Key - Seats, Cotter-Holes, &c.; and I do hereby declare the following to be a full, clear, and exact description of the same, reference being had to the accompanying drawing and to the letters of reference marked thereon.

My invention relates to devices used in connection with revolving and traversing drills for cutting key seats on shafts or key and cotter holes in " stub ends " and other objects and my invention consists firstly in the combination described hereafter, of a reversible screwed shaft with a revolving drill or drills, an intermittent motion at right angles to the said screwed shaft being imparted to the said drill or drills, by the devices hereafter described or their equivalents, the said screwed shaft being caused to impart a uniform reciprocating motion to the drills or to the object operated on by the drills; secondly, in a hollow spindle with clutches, bevel pinions and an internal rod, the whole being arranged for joint action and combined with a bevel wheel on the above mentioned screwed shaft in the manner described hereafter so that the latter may be reversed by the movement of the internal rod; thirdly, operating the reversing clutches from the carriage which carries the drills or which carries the object operated on by the drills through the intervention of a T shaped lever or its equivalent having a pointed arm and a spring rod with a pointed end the whole being combined and arranged for joint action substantially as described hereafter so that the reversal of the carriage may be instantaneous; fourthly, in certain adjustable screw collars or stops connected to the carriage and arranged in respect to certain adjustable collars on a sliding rod in combination with the above mentioned reversing lever and its adjuncts; fifthly, the stop motion described hereafter by which the advance of one of the drills is retarded during the movement of the machine.

In order to enable others skilled in the art to make and use my invention I will now proceed to describe its construction and operation.

Figure 1:
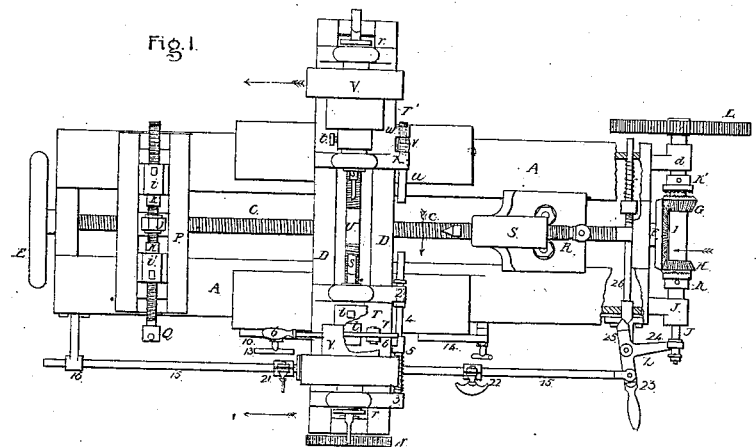
Figure 2:
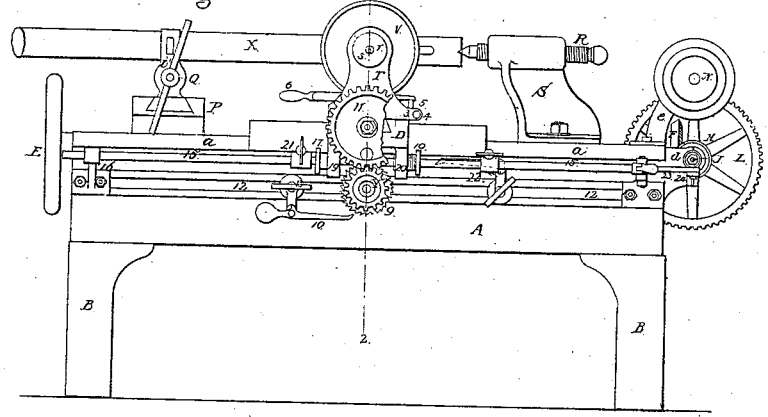
Figure 3:
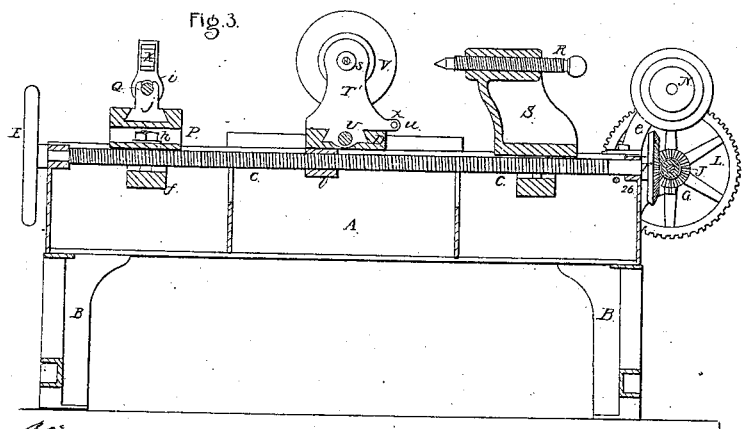
Figure 4:
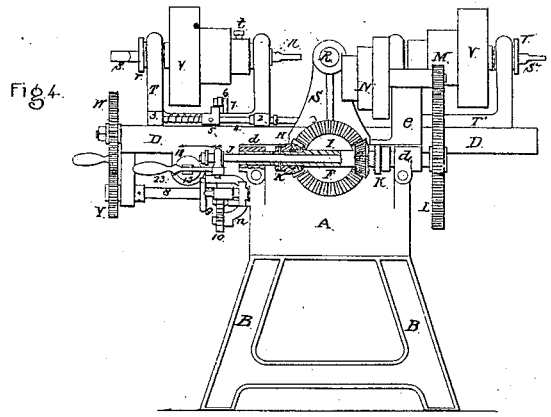
Figure 5:
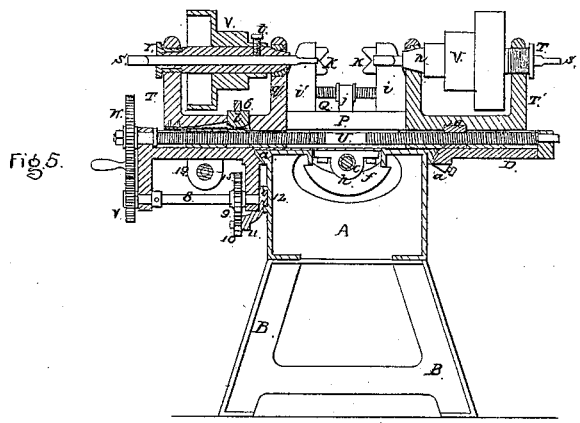

On reference to the accompanying drawing which forms a part of this specification, Figure 1 is a plan view of my improved machine for cutting cotter holes and key seats. Fig. 2, a front view. Fig. 3, a longitudinal section. Fig. 4, an end view looking in the direction of the arrow, Fig. 2, and Fig. 5, a transverse section on the line 1—2 Fig. 2.

Similar characters refer to similar parts throughout the several views.

A is the box shaped bed of the machine having on the opposite upper corners V shaped projections $a\ a$; both projections extending the whole length of the bed, which is in most respects similar to that of an ordinary slide lathe and which rests on suitable legs B B.

Within the bed A, and turning in the opposite ends of the same, is a screwed shaft C which passes through the nut $b$, the latter having screw threads adapted to those of the shaft and the nut being secured to the under side of the carriage D which, together with its adjuncts, will be especially alluded to hereafter.

The shaft C is furnished at one end with a suitable hand wheel E, and at the opposite end with a bevel-wheel F gearing into a beveled pinion G and into a similar pinion H, as best observed on reference to Figs. 1 and 4. Both these beveled pinions are arranged to turn freely in a hollow spindle or sleeve I and are retained in their proper position on the same by suitable collars. The sleeve turns in suitable boxes $d\ d$ attached to the end of the bed A, and through the center of the sleeve passes a spindle J. On the same sleeve are two clutches K and K' both having sharp pointed teeth those of the clutch K being adapted to similar teeth on the back of the pinion H, and those of the clutch K' to the teeth on the pinion G.

A pin passes through each clutch, through a slot in the sleeve, and through the spindle J, so that on moving the latter in the direction of the arrow (Fig. 4), the clutch K' is in gear with the pinion G, and on moving the spindle in the contrary direction the clutch K is moved into gear with the pinion H. The devices for imparting the desired movement to this spindle at the proper times will be particularized hereafter.

The sleeve I is provided with a wheel L into which gears a pinion M on a spindle, which turns on a bracket $e$ secured to the bed A of the machine, the said spindle being provided with a cone pulley N to receive a strap passing around a similar cone pulley on an adjacent counter shaft.

At the end of the bed A, opposite to that which has the above described appliances, is a carriage P (see Figs. 1, 2 and 3) attached to the bed by a transverse bar F and bolt h in such a manner that it can be moved along the bed to any desired position and secured after adjustment. In this carriage is a dovetailed groove for receiving the blocks i and i' (Figs. 1 and 5) through which passes a screwed pindle Q having left and right handed threads, the former being adapted to the threads cut in one block and the latter into threads cut in the other block so that on turning the said screwed spindle in one direction the blocks will move from each other, and on turning it in the opposite direction they will move toward each other the screw being retained in its proper longitudinal position by a projection j on the slide P, and the insides of the blocks being provided with dies k k, as best observed on reference to Fig. 5, so as to grip the object X on which the machine is required to operate. The opposite end of this object is supported by the center point of the screw R which is adapted to the bracket S, the latter being secured to the bed A of the machine by suitable bolts and a cross bar so as to be readily adjusted longitudinally on the bed to any desired position.

The carriage D previously alluded to is adapted to the bed of the machine and its V shaped grooves a a precisely in the same manner as the slide rest of an ordinary lathe so that on turning the screw C it will move steadily along the bed without the slightest vertical or lateral movement. This carriage D has a dovetailed groove adapted to receive the dovetailed projections on the head stocks T and T', the former of which is furnished with a movable nut l (to be more particularly described hereafter) and the latter with a permanent nut m both nuts having threads adapted to those cut on the spindle U. The threads of the latter which gear into the threads of one nut are right handed, while the threads which gear into the other nut are left handed, so that the headstocks will move toward or from each other according to the direction in which the spindle may be turned, the said spindle having its journals in the opposite ends of the slide. Both headstocks have a hollow spindle n having a conical termination adapted to a conical recess in a bush let into the vertical portion q of the headstock. The opposite end of the spindle n turns in a recess formed in a nut r which screws into the opposite end of the headstock and which bears against the outer end of the hollow spindle n, as best observed on reference to Fig. 5, so that any longitudinal looseness of the spindle caused by the constant strain imparted to it, may be taken up by the nut r.

Through the interior of the spindle of each headstock passes the cutting tool or drill s, and each spindle has a cone pulley V for receiving a driving strap from an adjacent counter shaft, a screw t serving to secure the cone pulley, spindle, and drill s, firmly together, so that they may all revolve simultaneously in the headstock.

It will be observed on refernce to Fig. 1, that the headstock T' has two projections w and x through which passes a pin u rendered adjustable by means of a nut v which fits snugly between the two projections. It will also be seen that the opposite headstock T has two projections 2 and 3 in which fits snugly, but so as to slide freely, a pin L, the sliding movement of this pin being limited by collars arranged to bear against the projection 2. This pin L has a catch 5 between which and the projection 3 intervenes a spiral spring tending to force the pin toward the center of the machine.

On the top of the catch 5 rests the end of the short arm of the lever 6 which turns in a stud 7 secured to the headstock T, the long arm of the lever, which is provided with a suitable handle, resting on the nut l and the latter being acted upon by a spring which tends to raise it out of gear with the threads of the spindle U. One end of this spindle has a wheel W gearing into a pinion Y (see Fig. 5) on a shaft 8 which turns in projections on the carriage D and to which is secured a ratchet wheel 9 the teeth of which are adapted to receive the point of the weighted pawl 10, which is hung to a bracket 11. This bracket is arranged to slide in a dovetailed recess 12 extending along the whole length of the bed, so that by turning a screw 13, it may be loosened, adjusted, and secured after adjustment. An adjustable pawl arrangement of a precisely similar character to that above described is connected to the same dovetailed groove 12 on the opposite side of the carriage D; the point of this pawl 14, (see Fig. 1) however, is allowed to fall to a limited distance by its own weight so as to engage into the teeth on the upper edge of the ratchet wheel 9, the pawl 10 engaging into the teeth on the lower edge of the wheel.

A rod 15, situated in front of the machine slides, at one end in a bracket 16 secured to the bed A, and passes freely through the two collars or stops 17 and 18, which screw, the former into the projection 19, and the latter into the projection 20 of the carriage D, the rod being provided with two collars 21 and 22, the former for acting on the end of the nut 17, and the latter for acting on the end of the nut 18, as the carriage is caused to traverse backward and forward on the bed of the machine. The opposite end of the rod 15 is jointed to the arm 23 of the T-shaped lever Z, which is hung to a bracket attached to the bed of the machine, the arm 24 of this lever having an eye through which passes the end of the rod J and on each side of which the rod is furnished with a collar, as best observed on reference to Fig. 1. It will be observed that the distance between these collars is greater than the width of the end of the arm 24, for an object which will be rendered apparent hereafter.

The arm 25 of the lever Z has at the end two inclined planes meeting at a slightly rounded point, the end of the sliding rod 26 having similar inclined planes. This rod 26 slides in the opposite sides of the bed of the machine, and is furnished with a coiled spring by means of which the end of the rod is pressed against the end of the arm 25 of the lever Z.

Operation: The width and length of the key or cotter hole in the rod $x$ having been determined upon, the drills or cutting tools $s\ s$ are prepared so as to cut a hole of a diameter corresponding to the desired width of the key hole.

The collars 21 and 22 are then adjusted so that they may be operated on at the proper time, the former by the screw collar or nut 17, and the latter by the collar 18 of the carriage D, this adjustment regulating the traverse of the carriage and drills and consequently determining the length of the key or cotter hole.

The brackets 11 carrying the pawls 10 and 14 are adjusted in the dovetailed groove 12 of the bed to such a position that as the carriage D is about to complete its movement in one direction, the teeth of the ratchet wheel $g$ will be brought in contact with the pawl 10, and as the carriage is about to complete its movement in the opposite direction the teeth of the same wheel will be brought in contact with the end of the pawl 14.

The drills or cutting tools $s\ s$ are adjusted in their respective headstocks so that the distance between the points of the opposite drills shall be greater than the distance between the ends of the rod $u$ and the rod L of the headstocks, both drills bearing with their edges against the bar, one on one side and the other on the opposite side of the said bar. A rotary motion is then imparted to the pulley N and to the pulley $v\ v$ of the headstocks.

Supposing the moving parts of the machine to be in the position illustrated in Fig. 1, the clutch K being in gear with the wheel H, and the clutch K' out of gear with the wheel G, the screwed spindle C and sleeve I turning in the direction of their arrows, and the carriage D traversing in the direction of its arrows. As the carriage continues to move the rotary drills will act simultaneously, one on one side and the other on the opposite side of the bar X.

As the carriage approaches the limit of its movement in the direction of its arrows, the screw collar or stop 17, will come in contact with the adjustable collar 21 on the rod 15 moving the latter in the same direction, pulling the arm 23 of the T shaped lever Z, and the arm 24, the latter consequently approaching the outer collar of the rod J. Before this arm reaches the collar however, and before any movement of the rod J takes place, one of the inclined planes on the end of the arm 25 has been sliding over one of the inclined planes on the end of the rod 26 thereby pushing the latter back. As the point of the arm 25 is approaching or about to coincide with the point of the rod 26; the arm 24 begins to bear upon the outer collar of the rod J, thereby commencing to draw the clutch K out of gear with the pinion H and the clutch K' toward the pinion G. The moment the point of the arm 25 passes the point of the rod 26 the spring of this rod, which has hitherto been compressed causes that inclined plane of the rod which had previously been free from contact with the arm 25 of the lever Z, to act on that inclined plane of the said arm which had previously been free from contact with the lever, so that the inclined plane of the rod, actuated by the spring slides over and bears against that of the arm 25 and completes the movement of the lever which had been commenced by the pulling of the rod 15, as before described. This completion of the desired movement of the lever causes the arm 24 to pull the rod J outward, and to draw the clutch K' into gear with the pinion G, while the clutch K is drawn completely out of gear with the pinion H. It will be seen without any further description of this portion of my improvement that the reversal of the screwed shaft C is accomplished the first or auxiliary portion by the pulling of the rod 15, and the final portion by the spring rod 26 in combination with the lever Z, hence that sudden reversal of the screwed shaft which is absolutely necesary for that precision which the nature of the work accomplished by the machine, demands. Before the reversal of the screwed shaft by the above described movements has been effected however, and as the screw collar 17 was approaching the adjustable collar 21 of the rod 15, the teeth of the ratchet wheel 9 have been brought in contact with the pawl, thereby partially turning the wheel and through the pinion Y and wheel W partially turning the screwed rod U which imparts a slight movement to the headstocks on the carriage D toward each other, thereby causing both drills $s\ s$ to take a deeper cut in the bar X on both sides of the latter simultaneously, prior to the return movement of the carriage D in a contrary direction to that pointed out by the arrows. As the carriage continues its movement in this direction the screw collar 18 will approach the collar 22 on the rod 15 finally bearing against the said collar so as to push the rod and move the lever Z causing the latter, with the assistance of the spring rod 26, to assume its previous position illustrated in Fig. 1, and pushing the clutch K into gear with the pinion H, and the clutch K' out of gear with the pinion G, thereby reversing the motion of the screwed shaft C and consequently causing the carriage to recommence its movement in the direction of the arrows. Prior to the reversal of the carriage D however, the teeth of the ratchet wheel 9 had been brought in contact with the point of the pawl 14, with precisely the same effect as when it, the wheel, had been brought in contact with the pawl 10, namely, the advance of the headstocks T and T' toward each other simultaneously and a deeper cut of the drills into the bar X.

It will now be seen that a continuous revolving motion in a line with the bed of the machine, and an intermittent progressive motion toward each other is imparted to both drills simultaneously, and that the result of these motions combined will be the cutting of two independent oblong slots one on each side of the bar X, and directly opposite to each other. In order to complete the desired key or cotter hole it is necessary that these two slots should meet each other, but the ends of the drills if brought in contact would tend to damage each other, hence the employment of the rods u and 4, the duties of which, in connection with their adjuncts, I will now proceed to describe. It has been already remarked that the distance between the ends of these rods is less than the distance between the ends of the two drills or cutting tools s s, so that as the two headstocks approach each other the ends of the rods u and 4 must meet before the points of the drills come in contact.

During the above described movements of the carriage D the short arm of the lever 6 (Fig. 1) has been resting on the collar or retainer 5 of the rod 4, the nut l of the headstock T being thereby depressed and maintained in gear with the threads of the screwed shaft U, when the end of the rod u of the headstock T'ʸ however comes in contact with the end of the rod 4, of the headstock T, the latter rod will yield or recede and the projection of the retainer 5 will be moved away from the end of the lever 6, which being released will allow the spring which bears against the nut to raise the latter out of gear with the threads of the screwed shaft U. The further progress of the headstock T is thus retarded while the headstock T' continues to advance pushing the other back and cutting through the thin partition which separates the two slots and thus converting the latter into the desired key or cotter hole.

It should be understood that the drills are arranged to cut on the sides as well as the end, so that the advancing drill will clear away any irregularity which might occur in consequence of the two slots not exactly coinciding with each other, thus a clear, uniform, and smooth hole is made in the bar X, ready for the reception of the keys or cotters.

I have described my improvements as applied to the cutting of an oblong hole in a round rod; it will be evident however, that they are equally applicable to the cutting of similar holes in objects of any form, that the machine may be used for cutting by one drill only, simple key seats on shafts, etc., and that my improvements are especially applicable to the cutting of the key and cotter holes of "stub-ends." It will also be evident that the screw may be so arranged as to impart a reciprocating motion to the object acted upon by the drills, while the latter revolve in stationary headstocks.

I am aware that two drills have been heretofore used for acting simultaneously on both sides of an object for the purpose of cutting holes through the same; I therefore do not claim broadly such a device; but

I claim as my invention and desire to secure by Letters Patent—

1. The within described combination of the reversible screwed shaft C with the revolving drill or drills, when an intermittent motion at right angles to the said screwed shaft is imparted to the said drill or drills by the devices herein described, or their equivalents and when the screw is caused to impart a uniform reciprocating motion to the drills or to the object operated on by the drills.

2. The hollow spindle I, its clutches K and K bevel pinions G and H, and internal rod J, the whole being constructed, and arranged for joint action, and combined with the bevel wheel F on the screwed rod C, as set forth, so that the said screwed shaft may be reversed by the movement of the internal rod J as herein set forth.

3. Operating the reversing clutches from the carriage which carries the drills, or which carries the object acted on by the drills, through the intervention of the T-shaped lever z or its equivalent with its pointed arm 25 and the spring rod 26 with its pointed end, the whole being combined and arranged for joint action substantially as and for the purpose herein set forth.

4. In combination with the above mentioned reversible lever z and its adjuncts— the adjustable screw collars 17 and 18 connected to the carriage D and arranged in respect to the rod 15 and its adjustable collars 21 and 22 substantially as set forth.

5. The within described stop motion by which the advance of one of the drills is retarded during the movement of the machine, that is to say, I claim furnishing one of the headstocks which carries one of the drills, with a movable nut $l$ so arranged as to be thrown out of gear with the screwed shaft $v$ by the headstock which carries the opposite drill, through the intervention of the devices herein described, or their equivalents.

In testimony whereof, I have signed my name to this specification in the presence of two subscribing witnesses.

WM. B. BEMENT.

Witnesses:
  HENRY HOWSON,
  CHARLES D. FREEMAN.